United States Patent [19]
Luhdorff

[11] 3,889,128
[45] June 10, 1975

[54] VARIABLE THRESHOLD ELECTRONIC RATE DETECTION SYSTEM FOR WHEEL SKID CONTROL

[75] Inventor: Dieter Luhdorff, Hannover, Germany

[73] Assignee: Westinghouse Bremsen-und Apparatebau GmbH, Hannover, Germany

[22] Filed: July 30, 1973

[21] Appl. No.: 383,824

[30] Foreign Application Priority Data
Sept. 6, 1972   Germany............................ 2243778

[52] U.S. Cl. .............................. 307/9; 303/21 CG
[51] Int. Cl. ............................................... B60t 8/12
[58] Field of Search ............ 307/9, 10 R; 303/21 P, 303/21 BE

[56] References Cited
UNITED STATES PATENTS 3,584,921   6/1971   Crawford .......................... 303/21 BE
3,604,761   9/1971   Okamoto et al. ............... 303/21 CG

FOREIGN PATENTS OR APPLICATIONS 1,052,012   12/1966   United Kingdom..................... 307/9
1,902,130   9/1969   Germany ................................ 307/9
2,044,045   3/1972   Germany ................................ 307/9

Primary Examiner—Robert K. Schaefer
Assistant Examiner—M. Ginsburg
Attorney, Agent, or Firm—R. W. McIntire, Jr.

[57] ABSTRACT

An electronic control system is provided for monitoring the speed of a vehicle wheel, differentiating the speed signal to obtain the wheel deceleration rate and comparing the deceleration rate with a predetermined threshold to obtain a wheel skid control signal when the deceleration rate exceeds the threshold level. At the time a wheel skid control signal occurs, the threshold automatically increases in value in accordance with increasing rates of deceleration of the wheel so that upon a subsequent decrease in said deceleration signal incident to the wheel skid being corrected, the deceleration signal is reduced below the threshold signal to terminate the skid control signal at a point in time prior to the deceleration signal decreasing to the predetermined value of the threshold.

4 Claims, 4 Drawing Figures

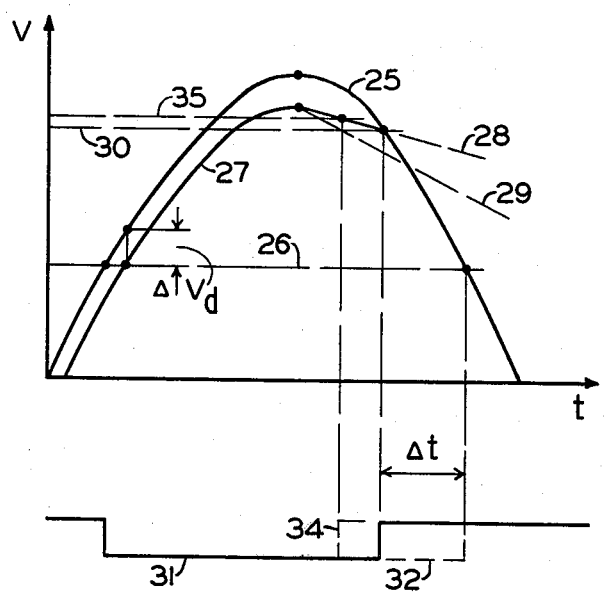

ical rate, which may be determined empirically in accordance with certain known parameters such as vehicle weight, normal road or rail surface conditions, etc. When the deceleration signal exceeds the threshold signal, a wheel skid control signal is provided for relieving the brake pressure to allow the skidding wheel to regain rotation under the accelerating effect transmitted to the wheels by the moving vehicle due to the friction between the wheel and road or rail surface. When the deceleration signal is restored to a value below the threshold signal, the wheel skid control signal is removed and the brake pressure is reapplied.

VARIABLE THRESHOLD ELECTRONIC RATE DETECTION SYSTEM FOR WHEEL SKID CONTROL

BACKGROUND OF THE INVENTION

This invention is concerned with a vehicle anti-skid brake control system of the type wherein a signal representative of the rate of deceleration of a particular vehicle wheel is compared with a threshold signal representative of a chosen maximum permissible deceleration rate, which may be determined empirically in accordance with certain known parameters such as vehicle weight, normal road or rail surface conditions, etc. When the deceleration signal exceeds the threshold signal, a wheel skid control signal is provided for relieving the brake pressure to allow the skidding wheel to regain rotation under the accelerating effect transmitted to the wheels by the moving vehicle due to the friction between the wheel and road or rail surface. When the deceleration signal is restored to a value below the threshold signal, the wheel skid control signal is removed and the brake pressure is reapplied.

In obtaining the wheel deceleration signal, a differentiating circuit is commonly employed to convert wheel speed into rate of change of wheel speed. Because of the erratic nature of the deceleration signal obtained, due to rough road or rail surfaces causing a jitter which is reflected through the differentiation process, signal conditioning means in the form of a filter network having an integral timing characteristic is normally included with the differentiator circuit to smooth the deceleration signal at the output of the differentiator and accordingly provide a more accurate comparison between the deceleration and threshold signals. It will be appreciated, however, that the time delay imposed by this filter network is undesirable due to the fact that following a reduction of brake pressure in response to operation of the anti-skid brake control system, a time lag occurs between the time the normal rotation of the skidding wheel is recovered and the time the deceleration signal actually drops below the threshold signal to indicate such recovery of the skidding wheel. Accordingly, the reduction of brake effort remains in effect a longer duration than necessary in correcting a wheel skid with the unfavorable result of extended stopping distances.

SUMMARY OF THE INVENTION

The object of the present invention therefore is to provide an improved anti-wheel skid control system in which the deceleration threshold corresponding to a maximum permissible rate of wheel deceleration is increased an amount proportionate to the rate of wheel deceleration in excess of the maximum permissible rate in order to terminate correction of a wheel skid substantially at the time the skidding wheel shows a tendency to resume acceleration.

In accordance with the present invention, this object is accomplished by providing comparator means for emitting a wheel skid control signal when a wheel deceleration signal provided by a differentiator having a filter network exceeds a threshold level to which a capacitor is initially charged in accordance with the setting of a voltage divider network. Subsequent to the deceleration signal exceeding the threshold signal, the capacitor is charged in accordance with the deceleration signal so as to automatically increase the threshold level. As soon as the skidding wheel begins to accelerate indicating that the wheel skid has been corrected, the deceleration signal begins to decrease at a rate depending upon the available adhesion between the wheel and the road or rail surface. This decreasing deceleration signal causes the capacitor to begin to discharge at some predetermined rate which will cause the deceleration signal to fall below the threshold signal at a point in time earlier than obtained in systems where the threshold signal remains constant, thus terminating the wheel skid control signal sooner and thereby overcoming the possibility of extended stopping distances due to unnecessarily prolonged wheel skid control operation.

A better understanding of the invention will be gained from the following more detailed explanation given with reference to the accompanying drawings of which:

FIG. 4 is a diagram of curves useful in explaining the operation of the invention.

DESCRIPTION AND OPERATION

Figure 1:
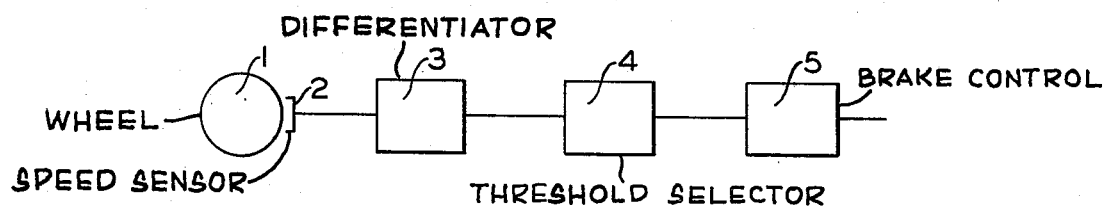
FIG. 1 is a block diagram showing generally the wheel skid control system of the invention.

In FIG. 1 is shown schematically a wheel 1 with which is arranged a sensor device 2 that provides output signals proportionate to the speed of rotation of wheel 1. These speed signals are fed to a differentiator 3 which includes a signal filtering network to condition the differentiated speed signals so that the output of differentiator 3 is a relatively smooth signal whose amplitude represents the deceleration rate of the wheel 1. A threshold selector 4 compares the deceleration signal with a predetermined threshold signal and emits a wheel skid control signal to a control circuit represented by block 5 whenever the wheel deceleration signal exceeds the threshold signal.

Figure 2:
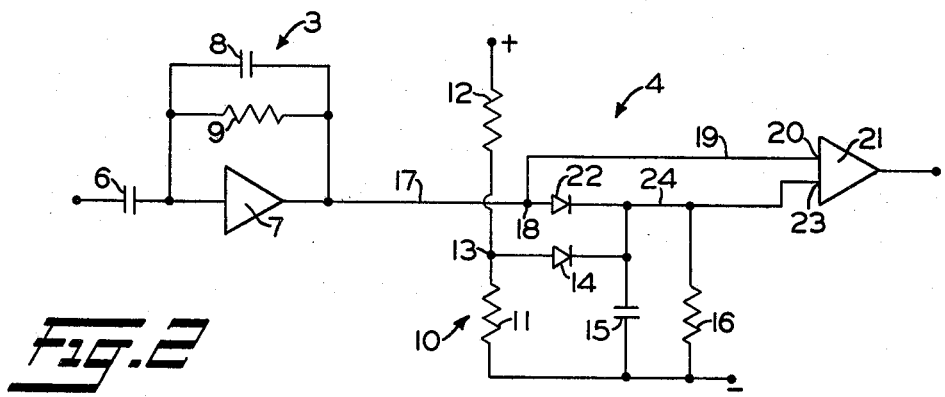
FIG. 2 is a circuit diagram showing details of the above system including circuitry for providing a variable threshold signal.

FIG. 2 shows the electronic circuitry comprising differentiator 3 and threshold selector 4. Differentiator 3 includes an operational amplifier 7, the input of which is arranged with a capacitor 6 to obtain the differentiating action of amplifier 7. Arranged in parallel with amplifier 7 is a capacitor 8 and a resistor 9 which serve as the filter network to condition the output of amplifier 7 into a relatively smooth signal substantially absent of any signal distortion introduced as a result of rough road or rail surface. Threshold selector 4 includes a voltage divider network 10 represented by resistors 11 and 12 that are separated by a junction point 13 which is connected to the anode of at least one diode 14 via which a capacitor 15 is charged. Connected in parallel with capacitor 15 is a resistor 16, the purpose of which is to control the discharge rate of the capacitor, as hereinafter explained. From differentiator 3, a conductor 17 leads to a junction point 18 from where a conductor 19 leads to the inlet 20 of an operational amplifier 21. Also leading from junction point 18 via at least one diode 22 to an inlet 23 of amplifier 21 is a conductor 24 to which are connected capacitor 15 and resistor 16.

Figure 3:
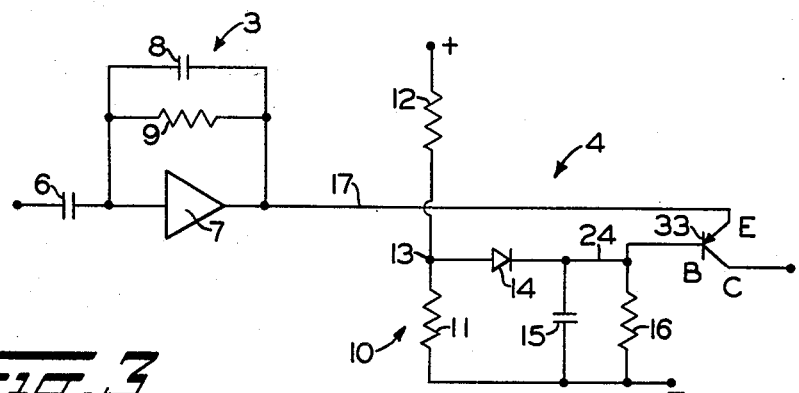
FIG. 3 is an alternative circuit of the FIG. 2 arrangement.

The alternate arrangement of the invention shown in FIG. 3 employs but a slight design modification of the same basic concept shown in the FIG. 2 arrangement. Emitter E of a transistor 33 is connected with the outlet of differentiator 3 via conductor 17, differentiator 3 being identical to that of FIG. 2. A voltage divider network 10, also identical to that of FIG. 2 is arranged with junction point 13 being connected to capacitor 15 via at least one diode 14. Arranged in parallel with capacitor 15 is resistor 16, which is in turn connected to base B of transistor 33 whose collector C forms the outlet of threshold selector 4.

In the voltage-time-diagram of FIG. 4, line 25 represents the first voltage which forms the deceleration signal, line 26 the second voltage which forms the maximum permissible deceleration rate threshold value, line 27 the voltage emanating from diode 22 which charges the capacitor 15, line 28 the voltage derived from the discharge of capacitor 15, line 29 a voltage which can be generated by changing time constant of capacitor 15, line 30 the voltage created by the intersection of line 25 with line 28 which forms the increased threshold value in the example of FIG. 2, and line 35 which represents the increased threshold value in the example of FIG. 3. In the lower part of the diagram, line 31 represents the wheel skid control signal at the output of the control circuit of block 5, line 32 the prolonged wheel skid control signal which is longer in duration by a time difference of $\Delta t$ when the threshold value remains unchanged, and line 34 a control signal in accordance with the example of FIG. 3.

The mode of operation of the arrangement shown in FIG. 2 is explained below with the help of the diagram of FIG. 4.

A first voltage emitted by differentiator 3, which forms the deceleration signal corresponding to line 25 in FIG. 4 is connected to the first inlet 20 of operational amplifier 21 via conductor 17, junction point 18 and conductor 19. The second voltage emitted by voltage divider 10, which forms the maximum permissible deceleration rate threshold value corresponding to line 26 in FIG. 4, extends via diode 14 to capacitor 15, and via conductor 24 to the second inlet 23 of operational amplifier 21, which compares the two voltages and emits a wheel skid control signal to the control circuitry of block 5 only if the first voltage is larger than the second one.

Thus the operational amplifier 21 does not form a control signal if the vehicle is not decelerated, since in such cases the first voltage equals zero and is therefore smaller than the permanently present second voltage.

With a decelerated vehicle, operational amplifier 21 fails to create a control signal as long as the first voltage, represented by line 25 in FIG. 4, is smaller than the second voltage represented by line 26.

If a further increase in the deceleration value of the first voltage (line 25) results in the first voltage exceeding that of the second voltage (line 26) due to wheel 1 decelerating at a rate indicative of a wheel skid, operational amplifier 21 generates a control signal for the control circuitry of block 5 in accordance with the lower part of FIG. 4, such control signal being utilized, for example, to relieve braking pressure effective at wheel 1. From this moment on, capacitor 15 is charged via diode 22 to a voltage per line 27, which is lower than the first voltage by the diode voltage drop. At the same time, diode 22 becomes forward biased and consequently conducts so as to establish at input 23 of amplifier 21 a voltage corresponding to the deceleration signal (line 25) minus the voltage drop $V_d$ across the conducting diode 22. This voltage establishes a new threshold value (line 27), the level of which remains proportional to and less than the deceleration signal until such time as wheel 1 resumes acceleration. It is to be understood of course that capacitor 15 is charged via diode 22 in parallel with the voltage established at amplifier input 23 for the duration diode 22 is conducting.

When the deceleration of wheel 1 has reached its maximum and then drops off indicating that the wheel skid control circuitry has relieved braking pressure, the first voltage at amplifier input 20 also drops. This initiates discharge of capacitor 15, which occurs at a relatively slow rate in accordance with a time constant dictated by resistor 16, as represented by line 28 of FIG. 4. Thus, the threshold signal effective at inlet 23 of operational amplifier 21 tends to be supported, due to the slow discharge of capacitor 15 so that the more rapidly decreasing deceleration signal forms at the intersection of the two voltages the increased threshold value, represented by line 30 in FIG. 4. At that moment the operational amplifier 21 terminates the formation of the wheel skid control signal, which occurs by a time difference $\Delta t$ (FIG. 4) sooner than would be the case if the initial threshold was maintained, as indicated by line 32 at the bottom of FIG. 4.

The mode of operation of the arrangement shown in FIG. 3 is explained below with the help of FIG. 4.

The first voltage, emitted by differentiator 3, which forms the deceleration signal corresponding to line 25 in FIG. 4, is present at emitter E of transistor 33. The second voltage, emitted by voltage divider 10 which forms the initial threshold value corresponding to line 26 in FIG. 4, extends via diode 14 to capacitor 15 and to base B of transistor 33. Collector C of transistor 33 emits a wheel skid control signal to the circuitry of block 5 only if the voltage at emitter E is greater than the voltage at base B.

Thus, collector C does not emit a control signal if the vehicle is not decelerated, since in such cases the first voltage at the emitter equals zero and is therefore smaller than the second voltage at base B, which forms the threshold value.

With a decelerated vehicle, collector C fails to emit a control signal as long as the first voltage, represented by line 25 in FIG. 4, is smaller than the second voltage which forms the threshold value and is represented by line 26 in FIG. 4.

In the event of a further increase of deceleration such that the first voltage at emitter E exceeds the second voltage at base B, collector C emits a wheel skid control signal that results in the circuitry of block 5 relieving brake pressure, for example. At the same time, capacitor 15 is charged to a voltage per line 27 in FIG. 4 which is smaller than the first voltage per line 25 in FIG. 4. The difference between the two voltages is determined by the voltage drop between the base and emitter terminals of transistor 33, and is represented in FIG. 4 by $\Delta V_d$, which also represents the diode pressure drop of the FIG. 2 arrangement.

When deceleration has reached its maximum and then drops off, the first voltage, which forms the deceleration signal, also drops. At that moment, discharge of capacitor 15 begins. Its voltage drops slowly, due to resistance 16 acting as a time constant, according to line 28 in FIG. 4, and approaches the first voltage that forms the deceleration signal. If the difference between the first voltage and capacitor voltage becomes substantially smaller than the voltage drop $\Delta V_d$ between the base and emitter, transistor 33 becomes nonconductive, and collector C ceases to emit a control signal to the wheel skid control circuitry of block 5. The wheel skid control signal is thus terminated as per line 34 in the lower part of FIG. 4, which is seen to be sooner than obtained in the example of FIG. 2.

By making junction point 13 at voltage divider 10 adjustable the second voltage which forms the initial threshold value can be varied and an optimum deceleration response to suit the respective type of vehicle can be attained.

Further, it is feasible to provide, as an alternate to the first arrangement, several diodes 22, instead of a single diode 22. By this means, the diode pressure drop $\Delta V_d$ can be varied, depending on the number of diodes, in order to maintain the wheel skid control signal an extended duration, which may be of advantage with certain vehicle types.

Similarly, resistor 16 may be made adjustable so that the time constant of capacitor 15 and thus the capacitor pressure drop is variable, as per line 29 in FIG. 4.

Having now described the invention what I claim as new and desire to secure by Letters Patent is:

1. An anti-skid brake control system for a vehicle comprising:
    a. means for generating a speed signal proportional to the rotational velocity of a wheel of said vehicle;
    b. differentiator means responsive to said speed signal for generating a deceleration signal; and
    c. wheel skid detector means for providing a wheel skid control signal to modulate brake force at a wheel whose generated deceleration signal exceeds a deceleration threshold, and for automatically adjusting said deceleration threshold from a first chosen value to a different value corresponding to the maximum value attained by said deceleration signal when said deceleration signal exceeds said first chosen threshold value such that a subsequent decrease of said deceleration signal below said different threshold value terminates said wheel skid control signal at a point in time prior to the time said deceleration signal decreases below said first chosen threshold value.

2. An anti-skid brake control system as recited in claim 1, further characterized in that the adjustment of said deceleration threshold to said different value is proportional to said deceleration signal.

3. An anti-skid brake control system as recited in claim 1, wherein said wheel skid detector means comprises:
    a. a constant voltage source;
    b. first circuit means including at least one diode to which a first voltage is connected from said voltage source at said first chosen threshold value;
    c. second circuit means having at least one other diode to which a second voltage is connected representative of said deceleration signal;
    d. a capacitor to which said diodes are connected in parallel for charging said capacitor to a potential corresponding to the higher of said first and second voltages to provide a reference signal;
    e. a comparator having a first inlet subject to said deceleration signal, a second inlet subject to said reference signal and an outlet providing said wheel skid control signal when said deceleration signal exceeds said reference signal; and
    f. a resistor in parallel with said capacitor for controlling the discharge of said capacitor so that said reference signal decreases at a slower rate than said deceleration signal.

4. An anti-skid brake control system as recited in claim 1, wherein said wheel skid detector means comprises:
    a. a constant voltage source;
    b. a transistor having an emitter terminal subject to said deceleration signal, a base terminal subject to a reference signal and a collector terminal at which said skid control signal is provided when said deceleration signal exceeds said reference signal;
    c. first circuit means including at least one diode to which a first voltage is connected from said voltage source at said first chosen threshold value;
    d. second circuit means including said emitter and base terminals of said transistor via which a second voltage representing said deceleration signal is conducted;
    e. a capacitor connected to the output terminal of said at least one diode and to said base terminal of said transistor so as to be charged according to the higher of said first and second voltages to provide said reference signal; and
    f. a resistor in parallel with said capacitor via which said capacitor is discharged at such rate that said reference signal decreases at a slower rate than said deceleration signal.

* * * * *